United States Patent
Kiely

(10) Patent No.: US 11,393,440 B2
(45) Date of Patent: **\*Jul. 19, 2022**

(54) METHOD AND SYSTEM FOR GENERATING AN AUDIO OR MIDI OUTPUT FILE USING A HARMONIC CHORD MAP

(71) Applicant: Xhail IPH Limited, County Dublin (IE)

(72) Inventor: Michael John Kiely, County Wexford (IE)

(73) Assignee: Xhail IPH Limited, County Dublin (IE)

( * ) Notice: Subject to any disclaimer, the term of this patent is extended or adjusted under 35 U.S.C. 154(b) by 0 days.

This patent is subject to a terminal disclaimer.

(21) Appl. No.: 17/461,817

(22) Filed: Aug. 30, 2021

(65) Prior Publication Data

US 2021/0390935 A1 Dec. 16, 2021

Related U.S. Application Data

(63) Continuation of application No. 17/192,886, filed on Mar. 5, 2021, which is a continuation of application
(Continued)

(51) Int. Cl.
*G10H 1/00* (2006.01)
*G11B 27/031* (2006.01)

(52) U.S. Cl.
CPC ......... *G10H 1/0066* (2013.01); *G10H 1/0025* (2013.01); *G11B 27/031* (2013.01);
(Continued)

(58) Field of Classification Search
CPC ...... G10H 1/0025; G10H 1/0066; G10H 1/38; G10H 2210/111; G10H 1/00;
(Continued)

(56) References Cited

U.S. PATENT DOCUMENTS 4,960,031 A * 10/1990 Farrand ................ G09B 15/023
84/462
5,467,288 A 11/1995 Fasciano
(Continued)

FOREIGN PATENT DOCUMENTS

CA 2259369 1/1998
CA 2663485 10/2009
(Continued)

OTHER PUBLICATIONS

European Patent Office, "Examination Report", in Application No. 19713370.5, dated Jul. 8, 2021, 7 pages.
(Continued)

*Primary Examiner* — Marlon T Fletcher
(74) *Attorney, Agent, or Firm* — Hickman Becker Bingham Ledesma LLP

(57) ABSTRACT

Techniques are provided for generating an output file. One technique involves the steps of generating audio or MIDI content blocks from one or more musical performances; receiving an input file having audio or MIDI music content; generating a harmonic chord map for the input file; using the harmonic chord map to automatically select a subset of the audio or MIDI content blocks, and generating the output file by combining the selected subset of content blocks and the input file. This technique may enable the creation of unique and new musical accompaniments by re-purposing audio or MIDI content from back catalogs and/or out-takes of musical works. The new arrangement may be provided in multiple music styles, genres, or moods and may contain performances from multiple musical instruments, which may be pre-recorded from live instrument performances and/or of MIDI generated musical content.

30 Claims, 14 Drawing Sheets

Related U.S. Application Data

No. 16/550,051, filed on Aug. 23, 2019, now Pat. No. 10,957,294, which is a continuation of application No. 15/922,188, filed on Mar. 15, 2018, now Pat. No. 10,424,280.

(52) U.S. Cl.
CPC . *G10H 2210/076* (2013.01); *G10H 2210/081* (2013.01); *G10H 2210/086* (2013.01)

(58) Field of Classification Search
CPC ....... G10H 2240/131; G10H 2240/145; G10H 2210/145; G10H 2210/576; G10H 2210/061; G10H 2210/105; G10H 1/0033; G10H 2210/151; G10H 2210/056; G10H 1/383; G10H 2240/311
See application file for complete search history.

(56) References Cited

U.S. PATENT DOCUMENTS

| | | | |
|---|---|---|---|
| 5,876,213 | A | 3/1999 | Matsumoto |
| 6,372,975 | B1* | 4/2002 | Shinsky ............... G10H 1/0025 84/612 |
| 9,286,876 | B1* | 3/2016 | Dabby ................... G10H 7/002 |
| 10,614,785 | B1* | 4/2020 | Dabby ................. G10H 1/0008 |
| 10,679,596 | B2 | 6/2020 | Balassanian |
| 10,930,296 | B2 | 2/2021 | Cook |
| 2002/0033090 | A1 | 3/2002 | Iwamoto |
| 2004/0055447 | A1* | 3/2004 | Childs, Jr. ............ G10H 1/0091 84/615 |
| 2005/0223879 | A1 | 10/2005 | Huffman |
| 2006/0230909 | A1 | 10/2006 | Song |
| 2006/0230910 | A1* | 10/2006 | Song ...................... G10H 3/125 84/616 |
| 2010/0131086 | A1 | 5/2010 | Itoyama |
| 2010/0192755 | A1* | 8/2010 | Morris .................... G10H 1/36 84/637 |
| 2010/0250510 | A1 | 9/2010 | Herberger |
| 2010/0257994 | A1 | 10/2010 | Hufford |
| 2010/0272054 | A1 | 10/2010 | Tatsuta |
| 2011/0175915 | A1 | 7/2011 | Gehring |
| 2012/0089390 | A1 | 4/2012 | Yang |
| 2012/0151344 | A1 | 6/2012 | Humphrey |
| 2012/0303617 | A1 | 11/2012 | Elliot |
| 2013/0254076 | A1 | 9/2013 | Thomas |
| 2014/0121797 | A1 | 5/2014 | Ales |
| 2014/0301573 | A1 | 10/2014 | Kiely |
| 2015/0081064 | A1* | 3/2015 | Ball ........................ G06F 16/60 700/94 |
| 2015/0081065 | A1* | 3/2015 | Ball ......................... G06F 3/16 700/94 |
| 2018/0046709 | A1 | 2/2018 | Roy |
| 2019/0287502 | A1* | 9/2019 | Kiely ................... G11B 27/031 |
| 2019/0341010 | A1* | 11/2019 | Wipperfurth ........... G06F 3/165 |
| 2019/0378483 | A1* | 12/2019 | Kiely .................... G10H 1/0025 |
| 2020/0074966 | A1 | 3/2020 | Sugar |
| 2020/0126524 | A1 | 4/2020 | Sheppard |
| 2020/0357370 | A1* | 11/2020 | Rein ..................... G06K 9/6256 |
| 2020/0357371 | A1* | 11/2020 | Rein ..................... G06K 9/6256 |
| 2020/0365125 | A1* | 11/2020 | Senn ....................... H04R 5/033 |
| 2020/0380940 | A1* | 12/2020 | Abdallah ............... G06N 7/005 |
| 2021/0210057 | A1* | 7/2021 | Kiely ....................... G10H 1/38 |
| 2021/0241732 | A1* | 8/2021 | Brosius ................ G10H 1/0025 |
| 2021/0390933 | A1* | 12/2021 | Kiely ....................... G10H 1/38 |
| 2021/0390934 | A1* | 12/2021 | Kiely ....................... G10H 1/38 |
| 2021/0390935 | A1* | 12/2021 | Kiely ................... G10H 1/0066 |

FOREIGN PATENT DOCUMENTS

| | | |
|---|---|---|
| EP | 2073193 | 6/2009 |
| EP | 3389028 | 10/2018 |
| GB | 2551807 | 1/2018 |
| WO | WO 9721210 | 6/1997 |
| WO | WO 9802867 | 1/1998 |
| WO | WO 2013/028315 | 2/2013 |

OTHER PUBLICATIONS

Current Claims, in Application No. 19713370.5, dated Apr. 28, 2021, 4 pages.

European Patent Office, "Summons to attend oral proceedings pursuant to Rule 115(1) EPC", in Application No. 19713370.5, dated May 18, 2022, 7 pages.

* cited by examiner

METHOD AND SYSTEM FOR GENERATING AN AUDIO OR MIDI OUTPUT FILE USING A HARMONIC CHORD MAP

CROSS-REFERENCE TO RELATED APPLICATIONS, BENEFIT CLAIM

This application claims the benefit as a Continuation of application Ser. No. 17/192,886 filed Mar. 5, 2021; which claims the benefit as a Continuation of application Ser. No. 16/550,051 filed Aug. 23, 2019 (now U.S. Pat. No. 10,957,294 issued Mar. 23, 2021); which claims the benefit as a Continuation of application Ser. No. 15/922,188 filed Mar. 15, 2018 (now U.S. Pat. No. 10,424,280 issued Sep. 24, 2019); the entire contents of which is hereby incorporated by reference as if fully set forth herein, under 35 U.S.C. § 120. The applicant hereby rescinds any disclaimer of claim scope in the parent application or the prosecution history thereof and advise the USPTO that the claims in this application may be broader than any claim in the parent application.

TECHNICAL FIELD

The present invention relates to a method and system for generating audio or MIDI (Musical Instrument Digital Interface) files. More specifically, the invention relates to a method and system for generating an audio or MIDI output file using a harmonic chord map.

BACKGROUND

In the music industry massive back catalogs of musical works previously produced by recording artists, bands or record companies are unused at all or most major record labels. Many songs, although often very well known, are largely exhausted and provide little or no new revenue to writers, record labels and publishers.

There is however a high demand for re-purposing some of these well-known songs through re-recording new and alternate versions of songs for usage in production industries, such as in films, trailers, gaming, advertising etc. However, such re-purposing presents a significant problem and barrier to usage as a result of the time and expense involved in re-recording new versions of old songs.

Additionally, many bands and artists have accumulated a very large back catalog of unused out-takes from previous works over a number of years and sometimes decades. Such out-takes are songs or parts of songs that never made it to album release. These out-takes are often in audio file format, but can include MIDI format also. These files often contain parts that can be considered hidden gems that become hard to find or indeed hard to use or reuse.

It is therefore an object of the present invention to provide a system and method for generating audio or MIDI output files using musical content derived from such back catalogs and/or out-takes of audio or MIDI content.

Further aspects of the present invention will become apparent form the ensuing description which is given by way of example only.

SUMMARY

According to an embodiment, there is provided a computer implemented method for generating an audio or MIDI output file, the method including using one or more processors to perform steps of:

generating audio or MIDI content blocks from one or more musical performances;

receiving an input file having audio or MIDI music content;

determining a chord structure and tempo for the input file;

generating a harmonic chord map from the chord structure and tempo for the input file;

using the harmonic chord map to automatically select content blocks, and generating the output file by combining the selected content blocks and the input file.

The step of generating audio or MIDI content blocks may include steps of:

receiving an audio or MIDI file including content in a harmonic key from a musical performance;

determining the harmonic key and adapting the musical performance to correspond to at least one alternative harmonic key, and recording said adapted musical performance in said alternative harmonic key to generate the audio or MIDI content blocks.

The step of generating audio or MIDI content blocks may include the further step of:

adapting the musical performance to correspond to all harmonic keys, including minor and major keys, and to a plurality of different tempos, recording said adapted musical performance in all of said harmonic keys and tempos to generate a plurality of audio or MIDI content blocks.

Alternatively, the step of generating audio or MIDI content blocks may include steps of:

receiving an audio or MIDI file including content in a harmonic key from at least one musical performance;

determining the harmonic key of the musical performance, and storing each received audio or MIDI file as an audio or MIDI content block.

Audio or MIDI content blocks may be stored and retrievable from storage according to musical instrument type, tempo and/or harmonic key of the musical performance.

Alternatively, the step of using the harmonic chord map of the input file to select content blocks includes steps of:

selecting at least one instrument type;

identifying content blocks for the or each instrument type that match the tempo of each bar of music in the harmonic chord map, and for each selected instrument type and for each bar of music in the harmonic chord map automatically selecting a content block from the identified content blocks that is in the same harmonic key or that has a part or section that is in the same harmonic key as the bar of music.

The method may include a step of removing sections of a selected content block that are not in the same harmonic key as the bar of music of the harmonic chord map.

The harmonic chord map may be generated automatically. Alternatively, the harmonic chord map is generated by a user manually inputting a chord structure and tempo for the input file.

The output file generated may be in an audio or MIDI file format.

The steps for generating audio or MIDI content blocks may be performed on a plurality of musical performances, in which each musical performance includes musical content from a different musical instrument.

The step of generating audio or MIDI content blocks may include the further step of adapting the musical performances according to one or more of different: moods, styles and/or genre.

The method may include a step of generating audio or MIDI content blocks for a plurality of musical performances in all twelve harmonic keys, in both major and minor keys (i.e. 24 harmonic keys), in a plurality of different tempos, and according to one or more of different moods, styles and/or genres.

The method may include a step of cutting the audio or MIDI content blocks to desired intervals/or and lengths.

The method may include storing the audio or MIDI content blocks in storage means.

The step of using the using the harmonic chord map of the input file to select content blocks may include steps of:

determining the harmonic key and tempo of at least one bar in the harmonic chord map;

selecting a content block corresponding to or matching a musical instrument for the at least one bar according to the determined harmonic key and tempo.

In this way, the content blocks are arranged according to the harmonic chord map and used to create the audio or MIDI output file have the same tempo and harmonic map, which ensures the harmonic integrity of the output file generated.

The step of using the using the harmonic chord map of the input file to select content blocks may include steps of:

determining the harmonic key and tempo of each bar in the harmonic chord map;

selecting content blocks corresponding to a plurality of selected musical instruments for each bar according to the determined harmonic key and tempo.

Each bar of the harmonic chord map defines a linear time slot and each content block selected is assigned to a time slot of the harmonic chord map.

The step of using the using the harmonic chord map of the input file to select content blocks may be performed automatically or manually by a user.

Content block selection may be further refined according to one or more of mood, style and/or genre. Such music genre, music style and mood selection is provided as input by a user to user interface means via a menu, such as a drop down menu, an icon based menu or any other suitable means which provides users with the capability to view and select from a plurality of options regarding music genre, style and/or mood data or other user preference as required or as desired.

The step of refining a content block according to one or more of mood, style and/or genre may be performed before and/or after generation of the output file to provide transitions within the audio or MIDI output file between alternative moods styles and/or genres.

The method may include steps of assigning a unique identifier to each content block and using the unique identifiers to select a unique combination of content blocks.

The unique identifiers of the selected content blocks are compared with records in a storage device, and if a record of a combination of the unique identifiers is located then an output file based on the combination of selected blocks is not generated. However, if a record of the combination of unique identifiers for the selected blocks is not located then this indicates the selection is unique and has not been generated before, and so the selected content blocks are combined to generate an audio or MIDI output file.

The method may include the step of storing a record of the combination of unique identifiers for the selected blocks of the audio of MIDI output file generated in a storage device.

In another embodiment of the invention, the method includes the step of operating a hold and replace module to hold some of the content blocks of the selected combination and replace others of the selected combination with alternative content blocks according to user preference input and matching the harmonic chord map.

The method may include the step of operating a shuffle module to automatically hold some of the content blocks of the selected combination and replace others of the selected combination with alternative content blocks matching the harmonic chord map.

In another embodiment of the invention, the method includes the step of operating an audio editing and mixing module to modify, refine, adjust, vary and/or change audio or MIDI characteristics of the output file generated.

In another embodiment of the invention, the method includes the step of operating an editing and mixing module to modify, refine, adjust, vary and/or change characteristics of a content block.

In another embodiment of the invention, the method includes the step of operating an audio editing and mixing module to adjust the tempo and/or shift the harmonic key of a content block. Such editing means and mixing means provides a user with full creative control over mix and other parameters to modify as desired the output file generated and content blocks used to form the output file.

The method may include the step of importing other instrument performances and/or voice from an external source for incorporation into the output file.

The method may include the step of operating a synchronisation module to synchronise the output file with an audio or MIDI file, a video file, a still image file, and/or a text file.

In another embodiment of the invention, the method includes the step of storing each output file generated in a storage device for retrieval and re-use.

The method may include the step of linking a plurality of storage devices to provide an extended storage library of content blocks and audio or MIDI output files for creating further content blocks for re-use.

Embodiments of the invention are operable to receive an audio or MIDI input file of a song, such as from a back catalog of music (including a vocal melody and/or instrument parts), determine a harmonic chord map of the song structure and then generate an audio or MIDI output file by combining pre-recorded content blocks with the input file recording of the original song. The content blocks are selected to harmonically support the input file recording of the original song and the process is performed automatically and in real time.

To generate content blocks for use in providing an accompaniment or backing track for the original input file the present invention adapts musical performances to correspond to all harmonic keys, including minor and major keys, and to a plurality of different tempos and moods. The content blocks may be derived from live instrument performances and/or of MIDI generated musical content. By repeating the process content blocks may be created for a plurality of different instruments, a plurality of performances for each instrument, in multiple genres, and at different moods and styles in multiple tempos recorded in the twelve keys (major and minor).

Alternatively, out-takes of audio or MIDI files derived from previous works may be stored and retrieved as content blocks.

The content blocks may then be automatically selected and where required, cut into time slices or slots at required intervals and in the required harmonic to provide a musical accompaniment for the original input file such that the original input file derived vocal melody will be accompanied by the selected content blocks, even though the music provided by the content blocks were not present in the original recording of that song, to provide an audio or MIDI output file.

The present invention is adapted to enable bands or artists to write new songs in their basic format which is inputted as an audio vocal or MIDI file for the new song. The invention is configured, on receiving an input file, to search through archived files of such out-takes and to cut relevant usable sections from many different unrelated recordings to combine relevant audio or MIDI content blocks together for any or multiple different instruments to thereby create a new backing track audio or MIDI file for the new song from previously unused recorded content in that band or artists personal content archive.

The present invention makes it possible to successfully generate a unique new musical accompaniment for any input file including an audio or MIDI file of a song (including a vocal melody and/or instrument parts). The new musical arrangement can be in any, or even multiple music styles, genres, or emotional moods and can contain performances from multiple musical instruments, which may be either pre-recorded from live instrument performances and/or of MIDI generated musical content.

The audio or MIDI output file generated includes a combination of the selected content blocks and the audio or MIDI input file of an original song. The content blocks used in the output file are uniquely tagged to ensure the musical arrangement of the selection of content blocks is unique.

Embodiments of the invention enable the entire process also being achieved entirely through audio and through MIDI format file types, with finished performances including the audio or MIDI output file being delivered as audio or MIDI files so that instrument sounds can be changed or applied outside of a DAW (Digital-Audio-Workstation) or similar third party software applications. It is also possible to import externally created audio or MIDI files and have those audio or MIDI files adapted and expanded to the twelve basic harmonic keys both Major and Minor. Imported MIDI files are then adapted through auto re-composition and exported to match the template map of any chosen song or melody.

In a still further embodiment of the invention, there is provided a non-transitory machine-readable medium including instructions that, when executed by one or more processors, cause the one or processors to perform the steps according to a method as described.

According to embodiments of the invention, there is provided a computer implemented system for generating an audio or MIDI output file, the system including:

means for generating audio or MIDI content blocks from one or more musical performances;

means for receiving an input file having audio or MIDI music content;

means for determining a chord structure and tempo for the input file;

means for generating a harmonic chord map from the chord structure and tempo for the input file;

means for using the harmonic chord map to automatically select content blocks, and means for generating the output file by combining the selected content blocks and the input file.

The system may further include means for receiving an audio or MIDI file including content in a harmonic key from a musical performance;

means for determining the harmonic key and adapting the musical performance to correspond to at least one alternative harmonic key, and means recording said adapted musical performance in said alternative harmonic key to generate the audio or MIDI content blocks.

The system may include means for adapting the musical performance to correspond to all harmonic keys, including minor and major keys, and to a plurality of different tempos, and means for recording said adapted musical performance in all of said harmonic keys and tempos to generate a plurality of audio or MIDI content blocks.

The system may further include means for generating audio or MIDI content from a plurality of musical performances, in which each musical performance includes musical content from a different musical instrument.

The means for generating audio or MIDI content blocks may include means for adapting the musical performances according to one or more of different moods, styles and/or genre.

The system may include means for generating audio or MIDI content blocks for each musical performance in all twelve harmonic keys, in both major and minor keys (i.e. 24 harmonic keys), in a plurality of different tempos, and according to one or more of different moods, styles and/or genres.

The system may include means for cutting the audio or MIDI content blocks to desired intervals/or and lengths.

The system may include means for storing the audio or MIDI content blocks in storage means.

The system may include means for determining the harmonic key and tempo of at least one bar in the harmonic chord map, and means for selecting a content block corresponding to a musical instrument for the at least one bar according to the determined harmonic key and tempo.

The system may include means for determining the harmonic key and tempo of each bar in the harmonic chord map; and means for selecting a content block corresponding to a plurality of selected musical instruments for each bar according to the determined harmonic key and tempo.

The system may include means for receiving an audio or MIDI file including content in a harmonic key from at least one musical performance;

means for determining the harmonic key of the musical performance, and means for storing each received audio or MIDI file as an audio or MIDI content block.

The system may include means for storing and retrieving audio or MIDI content blocks according to musical instrument type, tempo and/or harmonic key of the musical performance.

The system may include means for selecting at least one instrument type;

means for identifying content blocks for the or each instrument type that match the tempo of each bar of music in the harmonic chord map, and means for automatically selecting a content block from the identified content blocks that is in the same harmonic key or that has a part or section that is in the same harmonic key as the bar of music in the harmonic chord map for each selected instrument type.

The system may include means for removing sections of a selected content block that are not in the same harmonic key as the bar of music of the harmonic chord map.

The system may include means for assigning a unique identifier or tag to each content block and using the unique identifiers to select a unique combination of content blocks.

Use of the unique identifiers for the combination as a registration number restricts the combination or anything close from ever recurring thus ensuring the accompaniment file generated is unique and original. A record of the combination of unique identifiers for the selected content blocks in the audio of MIDI output file generated in a storage device. Each output file generated is stored in a storage device for retrieval and re-use and a plurality of storage devices may be linked to provide an extended storage library of content blocks and audio or MIDI output files for creating further content blocks for re-use.

The system may include storage means for storing a record of the combination of unique identifiers for the selected blocks of the audio of MIDI output file generated in a storage device.

The system may include a hold and replace module to hold some of the content blocks of the selected combination and replace others of the selected combination with alternative content blocks according to user preference input and matching the harmonic chord map.

The system may include a shuffle module to automatically hold some of the content blocks of the selected combination and replace others of the selected combination with alternative content blocks matching the harmonic chord map.

The system may include an audio editing and mixing module operable to modify, refine, adjust, vary and/or change audio or MIDI characteristics of the output file generated.

The editing and mixing module may be further operable to modify, refine, adjust, vary and/or change characteristics of a content block.

The editing and mixing module may be operable to adjust the tempo and/or shift the harmonic key of a content block.

Such editing and mixing means provides a user with full creative control over mix and other parameters to modify as desired the output file generated and content blocks used to form the output file.

The system may include means for importing other instrument performances and/or voice from an external source for incorporation into the output file.

The system may include a synchronisation module to synchronise the output file with another audio or MIDI file, a video file, a still image file, and/or a text file.

The system may include means for linking a plurality of storage devices to provide an extended storage library of content blocks and audio or MIDI output files for creating further content blocks for re-use.

There is also provided a computing device and/or arrangement of computing devices having one or more processors, memory and display means operable to display an interactive user interface having the features as described.

In another embodiment of the invention, there is provided a system for generating an audio or MIDI output file for adapting an audio or MIDI input file substantially as herein described with reference to and as shown in the accompanying drawings and/or examples.

In another embodiment of the invention, there is provided a method for generating an audio or MIDI output file for adapting an audio or MIDI input file substantially as herein described with reference to and as shown in the accompanying drawings and/or examples.

DRAWINGS

Embodiments of the invention will be more clearly understood from the following description, given by way of example only, with reference to the accompanying drawings, in which.

DETAILED DESCRIPTION

A method and system according to the present invention is implemented by one or more computer processors and memory including computer software program instructions executable by the one or more processors. The computer processors may be provided by a computer server or network of connected and/or distributed computers.

The audio and/or MIDI input and output files of the present invention will be understood to be received, stored or recorded files containing audio or MIDI data or content which produce sound output when processed by an audio or MIDI player. An audio file may be received or recorded in audio file formats, including, but not limited to, audio WAV format, MP3 format, advanced audio coding (AAC) format, Ogg format or in any other format, analog, digital or otherwise, as required. The desired audio or MIDI format may optionally be specified by a user.

A harmonic chord map will be understood to be a chord or harmonic progression map, which is a representation of the tempo and progression of successive musical chords or harmonic keys in a musical work.

Figure 3:
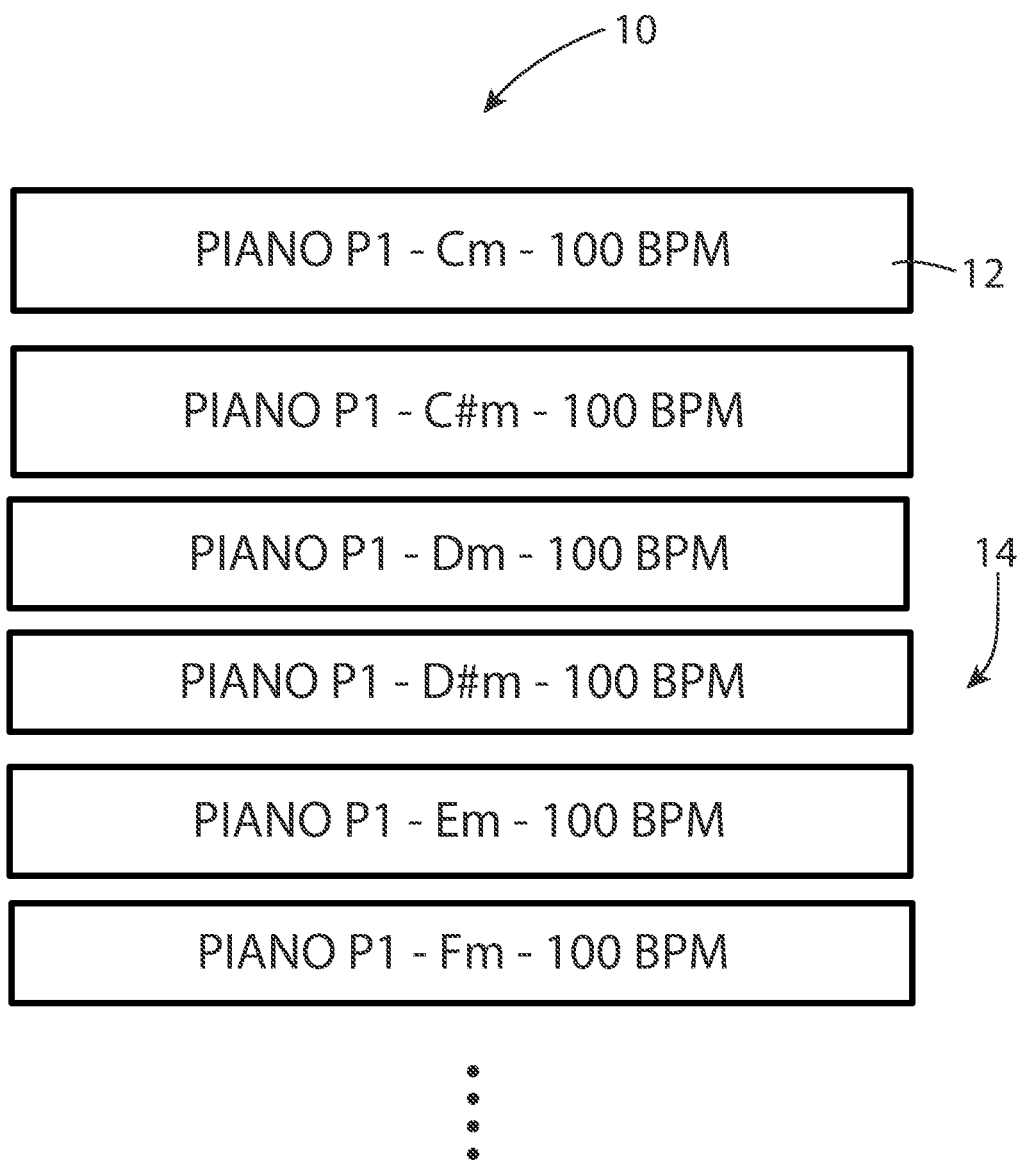
FIG. 3 is a block diagram showing recordings of a piano performance in a set of harmonic keys according to the invention.

Referring to the drawings and initially to FIG. 3, the method includes an initial step 10 of generating audio or MIDI content blocks from one or more musical performances. Step 10 includes receiving an audio or MIDI file including a musical performance, determining the harmonic key of the performance and adapting the musical performance to correspond to all harmonic keys and at a plurality of different tempos.

As shown in FIG. 3, and by way of example only, a file corresponding to a piano performance, 'PIANO P1' 12 has been received and determined as being in the C minor harmonic key at a tempo of 100 beats per minute (bpm). The combination of the harmonic key and tempo defines a harmonic chord map for the musical performance file 12.

It will be understood however that a musical performance may have multiple portions or bars, each sequential bar having the same or a different harmonic key and tempo. It will be also understood that there are twelve (12) basic harmonic keys upon which music may be composed and recorded. These harmonic keys also have other harmonic factors to be considered such as major/minor.

Once the harmonic chord map for the performance 'PIANO P1' 12 is determined as being in C minor and 100 bpm, it is then recorded in all twelve minor key sets at 100 bpm, namely:
Cm—C minor, C #m—C sharp minor, Dm—D minor, D #m—D sharp minor, Em—E minor, E #m—E sharp minor, Fm—F minor, F #m—F sharp minor, Gm—G minor, G #m—G sharp minor, Am—A minor, A #m—A sharp minor and Bm—B minor,
and in all 12 major key sets at 100 bpm, namely:
CMaj—C major, C #Maj—C sharp major, DMaj—D major, D #Maj—D sharp major, E Maj—E major, E #Maj—E sharp major, F Maj—F major, F #Maj—F sharp major, G Maj—G major, G #Maj—G sharp major, A Maj—A major, A #Maj—A sharp major and B Maj—B major.

These twenty four piano performance recordings at 100 bpm, indicated generally by the reference numeral 14, are then recorded at a plurality of different tempos, such as 110 bpm, 115 bpm, 120 bpm, 125 bpm, 160 bpm and so on, up to a predefined maximum tempo limit.

By creating musical performances, such as a piano performance and then recording the same performance in all eleven (12) keys (including the major and minor) and at multiple tempos, the entire musical spectrum for that musical performance 'PIANO P1' is provided. It is these recordings for the entire musical spectrum for a musical performance received that are used to generate a number of content blocks 16, as shown in FIG. 3.

The steps may be repeated for many different musical performances in which each musical performance includes musical content from a different musical instrument, such as drums, bass, guitar, strings and other instruments as required or as desired. The content blocks 16 may be further adapted according to one or more of different moods, styles and/or genres.

The method therefore includes generating audio or MIDI content blocks 16 for each of many different musical performances 10 in all twelve harmonic keys, in both major and minor keys (i.e. twenty four harmonic keys), at a plurality of different tempos, and according to one different moods, styles and/or genres and storing the audio or MIDI content blocks in storage means.

The audio or MIDI content blocks may optionally be formatted to desired intervals and lengths as required and a unique identifier is also assigned to each content block recorded.

Figure 1:
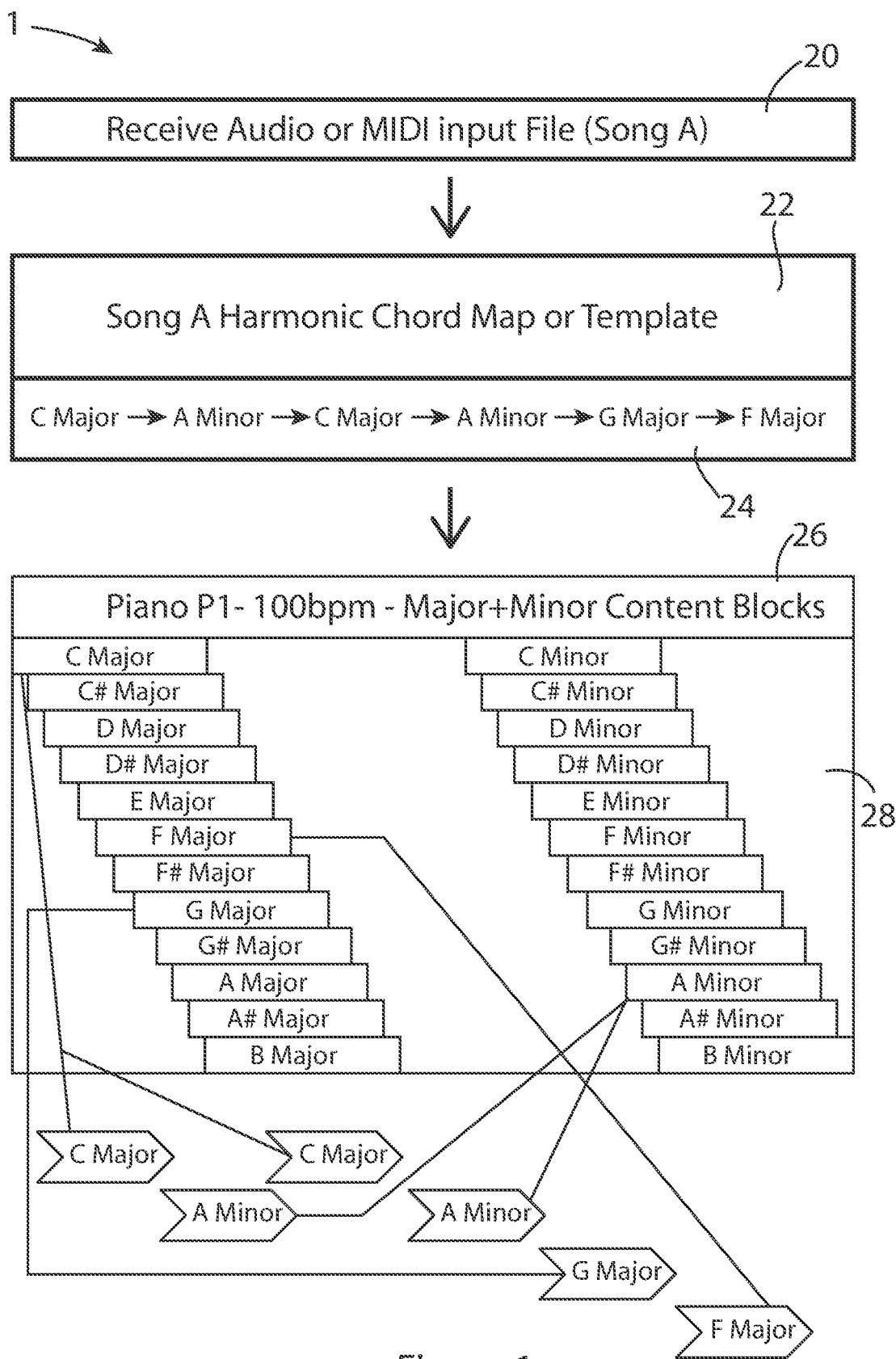
FIGS. 1 and 2 are stylised schematics showing steps in a method for generating an audio or MIDI output file according to the present invention.
Figure 2:
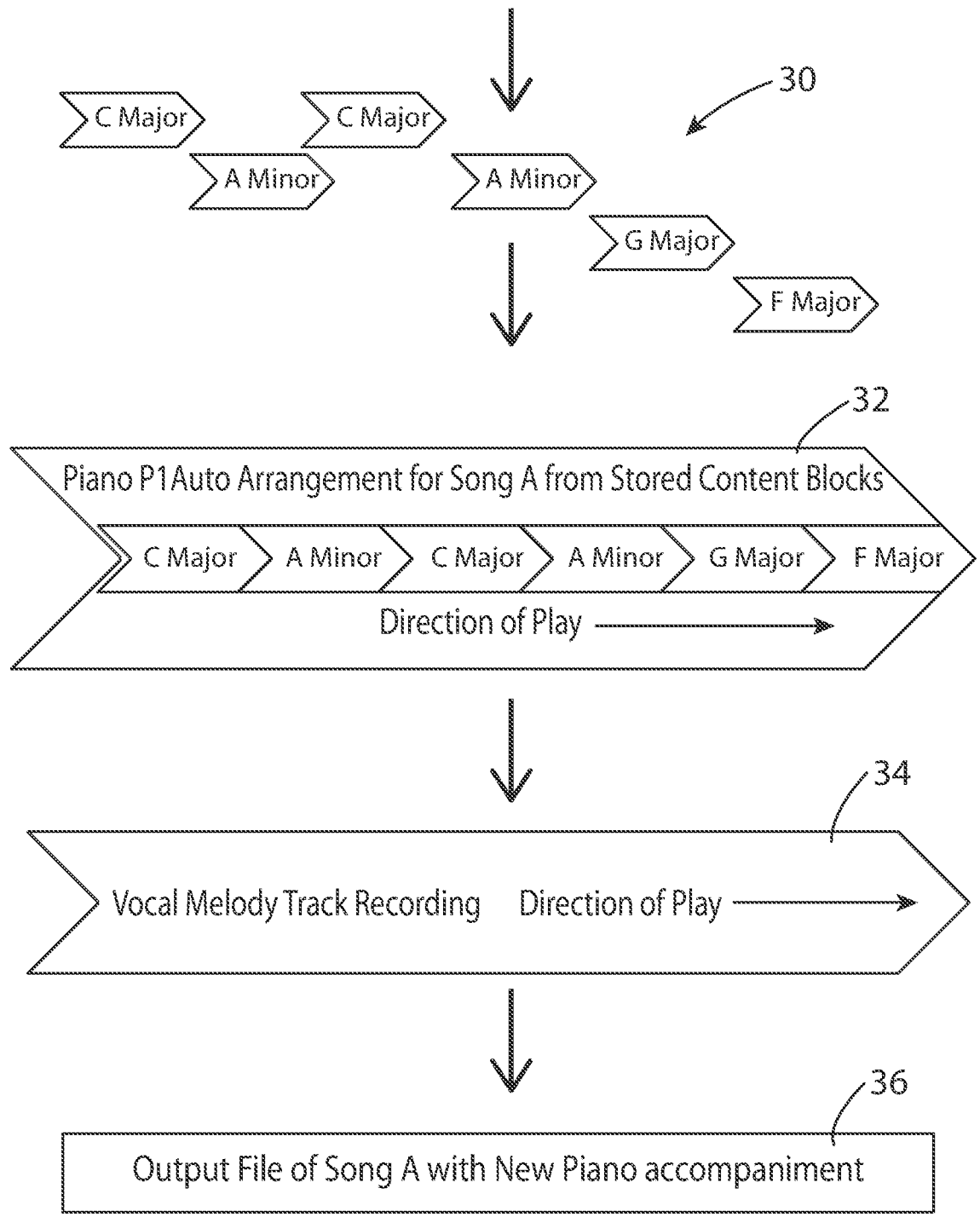

Turning now to FIGS. 1 and 2, the method 1 includes a step 20 of receiving an input file (shown as Song A) having audio or MIDI music content. The input file may be a vocal melody and may include both vocal and/or musical performances from back catalogs of pre-recorded music and/or live music.

At step 22, a chord structure (that is, the harmonic keys making up the performance) and tempos thereof for the input file is determined and a harmonic chord map is generated. In the instance shown in FIG. 1, the harmonic chord map 24 is determined as including, in a sequential order, the following six harmonic keys or bars at a tempo of 100 bpm: C Major—A Minor—C Major—A Minor—G Major—F Major At step 26, a content block selection means automatically or by user input determines an instrument or instruments to be included in the accompaniment for the input file Song A, and it having been determined that the input file requires a piano accompaniment, at step 28, identifies from a storage means specific or donor database specific content blocks that match the harmonic chord map 24 for such a piano accompaniment.

At step 30, content blocks corresponding to a musical instrument 'PIANO P1' and having the determined harmonic key and tempo for the harmonic chord map are selected by the content block selection means. The content block selection means selects content blocks from a database or library of stored content blocks for a selected instrument, such that each content block selected matches the chord structure and tempo of the input file 'Song A'.

The selection of the instrument or instruments to include may be automatically performed by the content block selection means, and/or may be specified by a user according to user preferences. Such a selection is performed by initially analysing all content blocks from relevant keys and tempos for the specific instrument for a match and then selecting such matching content blocks for each bar C Major—A Minor—C Major—A Minor—G Major—F Major of the input file.

At step 32, the selected content blocks are time sliced or cut to the desired length in order to fit the bars and arranged along the harmonic map of the input file. Thus each bar of the harmonic chord map defines a linear time slot and each content block selected is assigned to a time slot of the harmonic chord map.

Thus as shown for an input file with the an original chord structure C Major—A Minor—C Major—A Minor—G Major—F Major at 100 bpm, the content blocks selected, for example, for a piano accompaniment, will also have a chord structure C Major—A Minor—C Major—A Minor—G Major—F Major at 100 bpm. The relevant and acceptable content blocks for an instrument are arranged along the harmonic chord map in the correct order of harmonic chord marking with a tempo time bar and beat markers.

The process is then repeated thus adapting other selected instrument content blocks as required. For example, the process may select drums, bass, guitar, strings etc and adapt content blocks for these instruments for the harmonic chord map of the original input file. Content blocks may be further selected or refined according to one or more of mood, style and/or genre, and such selection is provided as an input request by a user. Such a step of refining a content block may be performed before and/or after generation of the output file to provide transitions within the audio or MIDI output file between alternative moods styles and/or genres.

The combination and arrangement of selected content blocks along the harmonic map of the input file thus forms an instrument accompaniment or backing track for the original input file song. The unique identifiers of the selected content blocks are compared with records in a storage device to ensure that the combination of content blocks selected is unique.

At step 34, the original input file is aligned to the chord structure harmonic and time map markings to ensure correct placement for playback with the instrument accompaniment or backing track including the selected content blocks.

At step 36, an audio or MIDI output file including the selected content blocks and the original input file song is generated to provide an adapted version of the vocal melody for playback.

The present invention further provides a suite of tools to provide a user with full creative control over mix and other parameters to modify as desired the audio or MIDI output file generated and content blocks used to form the output file, including:

A hold and replace module to enable users to hold or retain some of the content blocks of the selected combination and replace others of the selected combination with alternative content blocks according to user preference input and matching the harmonic chord map.

A shuffle module to automatically hold some of the content blocks of the selected combination and replace others of the selected combination with alternative content blocks matching the harmonic chord map.

An editing and mixing module to modify, refine, adjust, vary and/or change audio or MIDI characteristics of content blocks and/or the output file generated and to adjust the tempo and/or shift the harmonic key of a content block.

An importing module to enable live or recorded instrument performances and/or voice to be imported from an external source for incorporation into the output file.

A synchronisation module to synchronise the output file with an audio or MIDI file, a video file, a still image file, and/or a text file.

The present invention enables the entire process also being achieved entirely through audio and through MIDI format file types, with finished performances including the audio or MIDI output file being delivered as audio or MIDI files so that instrument sounds can be changed or applied using a DAW (Digital-Audio-Workstation) or other software applications. It is also possible to import externally created audio or MIDI files and have those audio or MIDI files adapted and expanded to 12 basic harmonic keys both Major and Minor. Imported MIDI files are then adapted through auto re-composition and exported to match the template map of any chosen song or melody.

An example of the present invention for use in adapting an input file will be described with reference to FIGS. 4 to 9.

Figure 4:
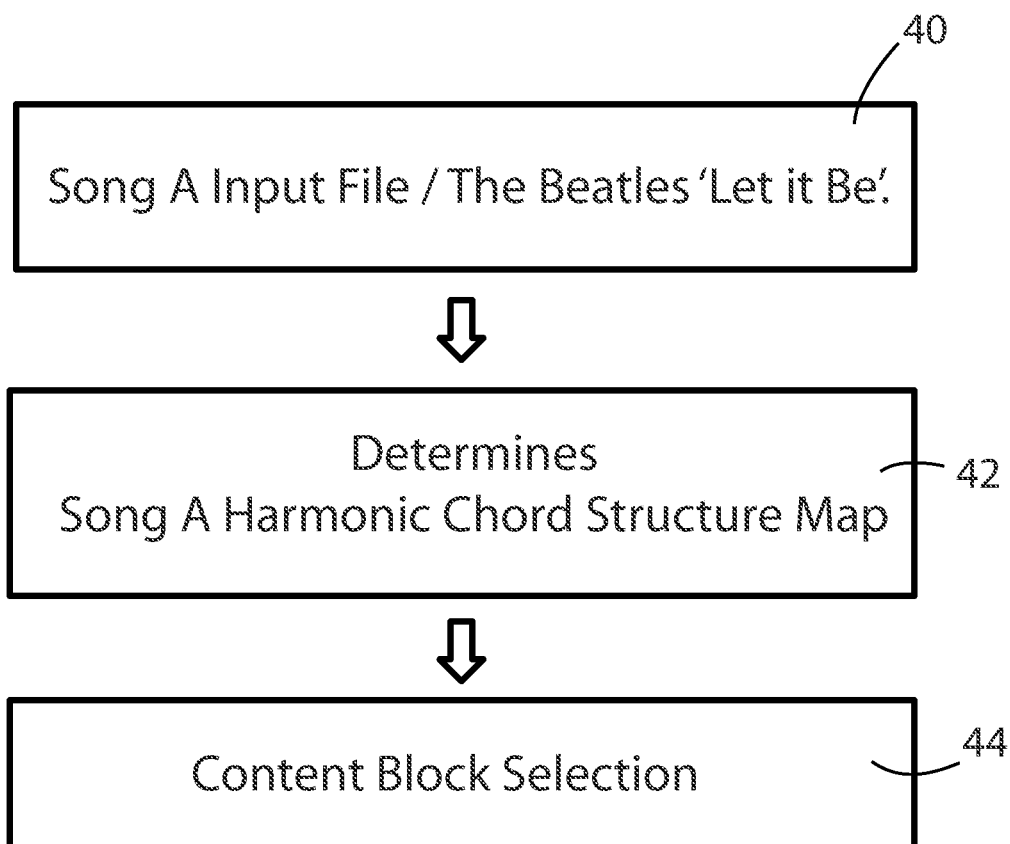
FIGS. 4 to 8 are flow diagrams showing an example of the present invention in use in generating an audio or MIDI output file.
Figure 6:
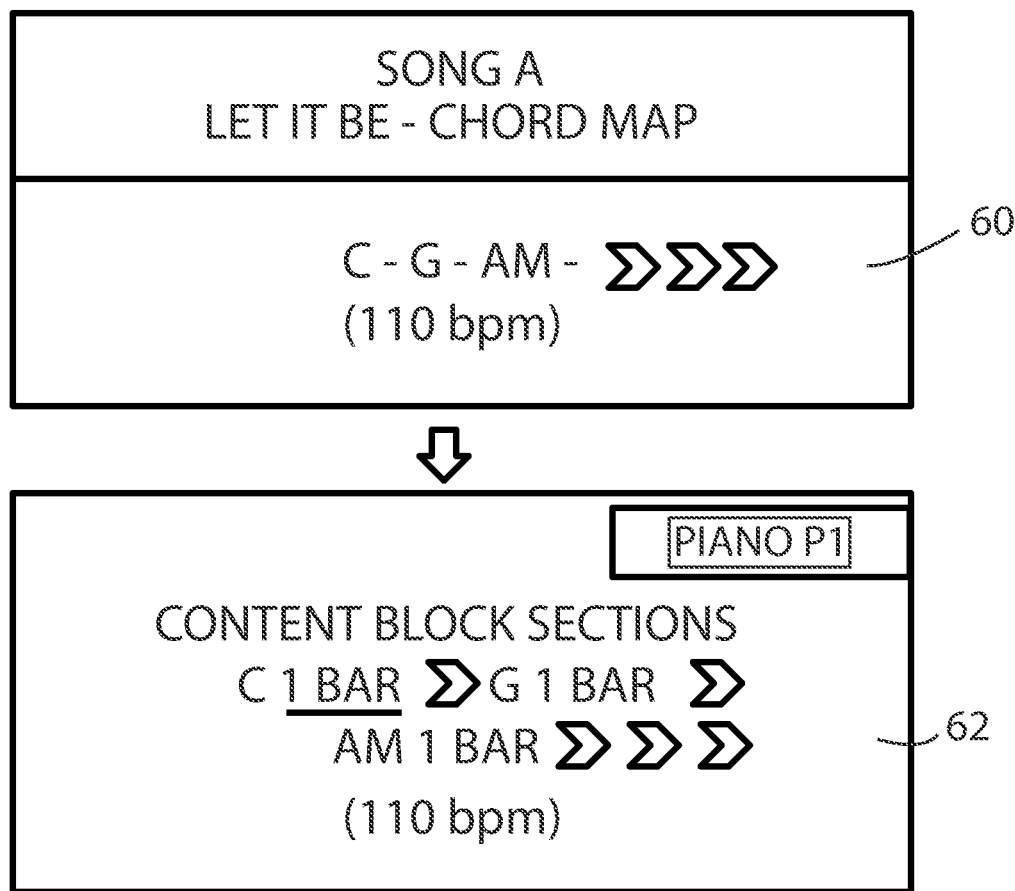

As shown in FIG. 4, at step 40, an input file having the title 'Let it Be', a well known song by the band The Beatles is received as input. At step 42, the harmonic chord map for the song is determined based on the various harmonic keys and tempos for each bar of the song. FIG. 6 shows the harmonic chord map 60 for the song 'Let it Be' is determined as including bars with harmonic keys C, G and A Major, all at a tempo of 110 bpm.

At step 44, this harmonic chord map is provided as input to the content block selection means for selection of content blocks to be used in generating a musical backing track or accompaniment for the song 'Let it Be' according to the harmonic chord map.

Figure 5:
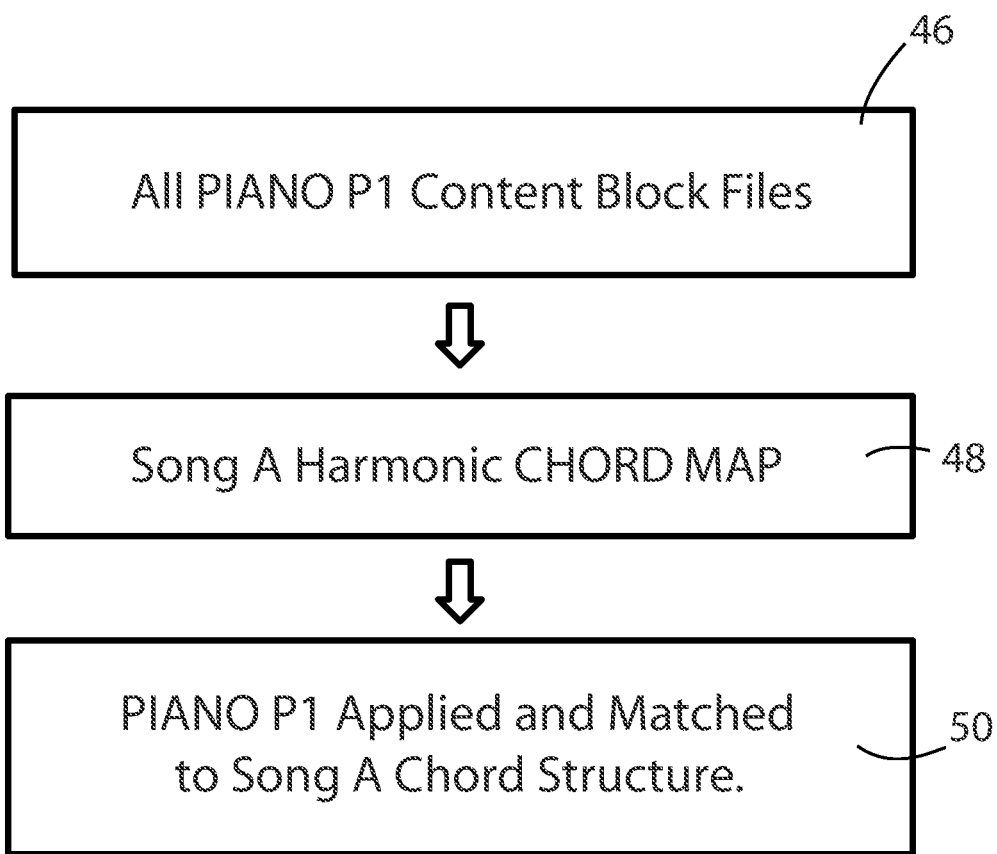

As shown in FIG. 5, at step 46, the content block selection means automatically or by user driven input determines that the backing track or accompaniment for the input fie song 'Let it Be' should include a piano instrumental part, and so examines all stored piano content blocks P1 and, at step 48, selects content blocks from the Piano P1 content blocks matching the harmonic map and tempo of the harmonic chord map. As shown at step 62 of FIG. 6, content blocks from repository 'Piano P1' that were recorded in the harmonic keys C, G and A Major and at a tempo of 110 bpm are selected thus matching the harmonic chord map of the original input file for 'Let it Be'. As shown in FIG. 5, step 50, these selected content blocks are applied and matched to the harmonic chord map of the original input file song 'Let it Be'. In this way, acceptable content blocks for an instrumental accompaniment that harmonically supports the original input file are selected arranged along the harmonic chord map of the input file, in the correct order of harmonic chord marking with a tempo time bar and beat markers.

Figure 7:
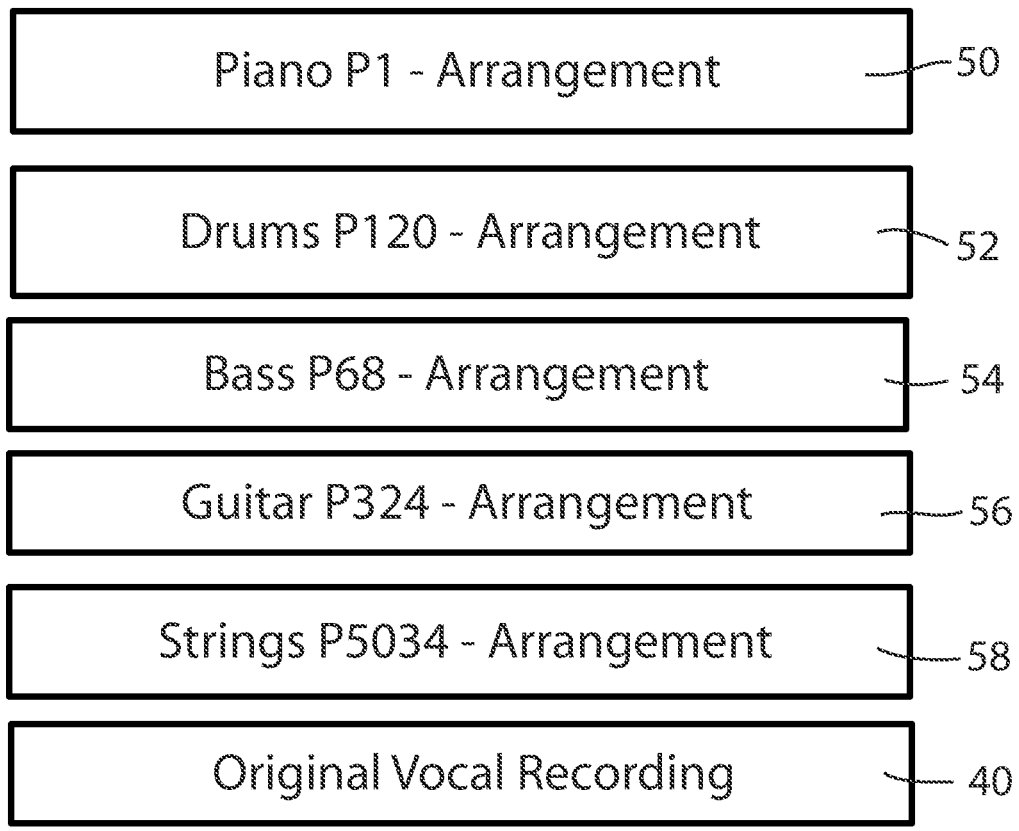

As shown in FIG. 7, this process is then repeated thus selecting other content blocks for different instruments as required. For example, the process may additionally select content blocks for a drum accompaniment 52, bass 54, guitar 56, strings 58 and select content blocks for these instruments for the harmonic chord map of the original input file received at 40. As shown, the original input file 40 is aligned to the chord structure harmonic and time map markings to ensure correct placement for playback with the instrument accompaniment or backing track including the selected content blocks 50, 52, 54, 56, 58.

Figure 8:
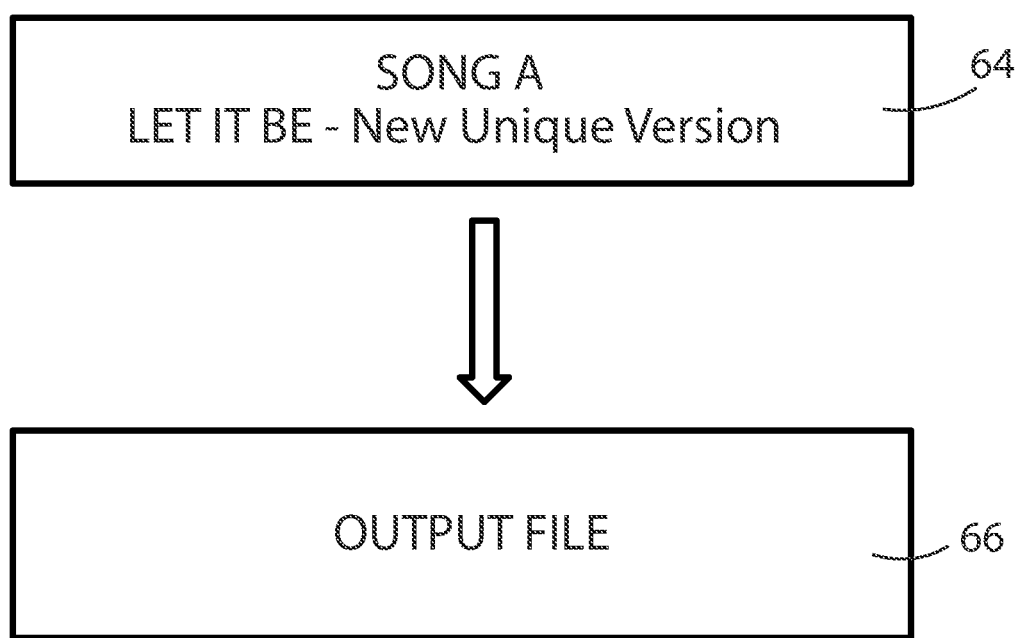

As shown in FIG. 8, at step 64, the unique identifiers of the selected content blocks are compared with records in a storage device to ensure that the combination of content blocks selected is in the selected arrangement of content blocks 50, 52, 54, 56, 58 is unique, and at step, 66 an audio or MIDI output file including the arrangement of content blocks 50, 52, 54, 56, 58 and the original input file song 40 is generated to provide an adapted unique version of the original input file for playback.

Figure 9:
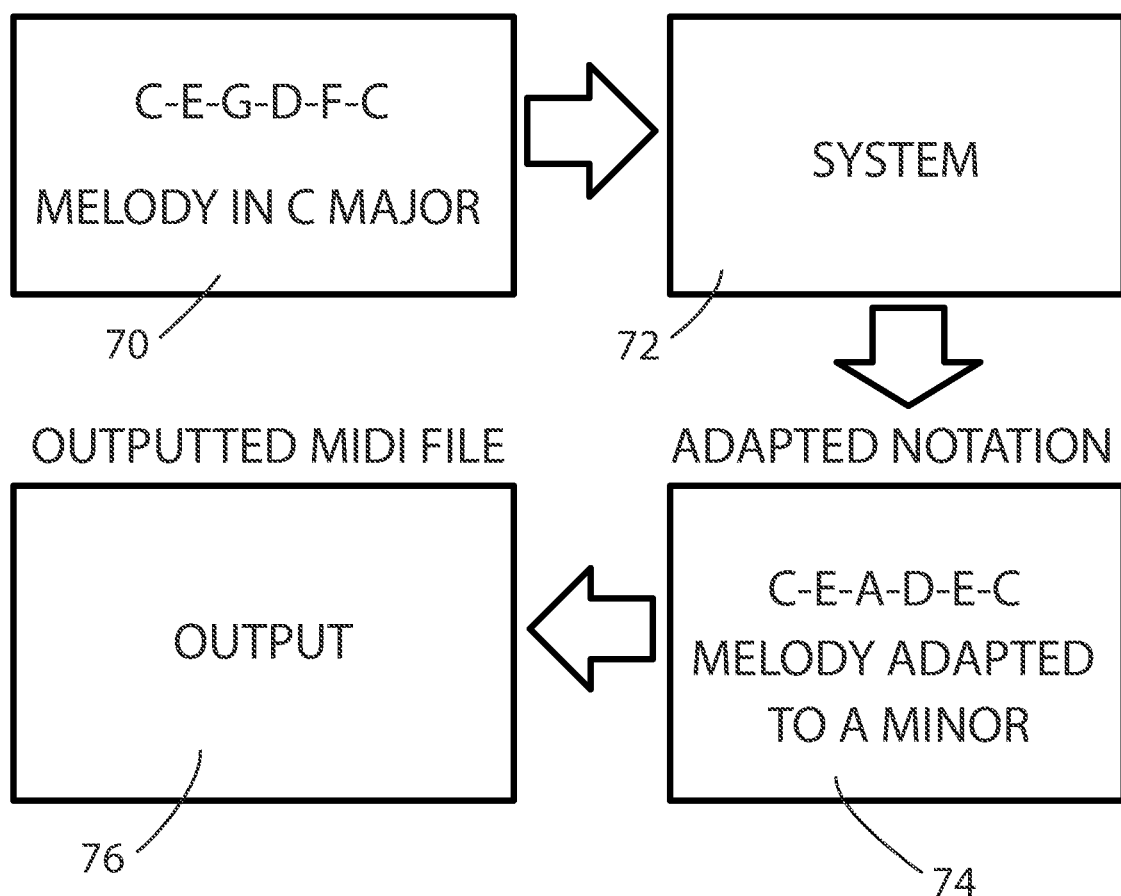
FIG. 9 is a flow diagram showing steps in the method according to the present invention in use in an externally created MIDI file.

FIG. 9 is a flow diagram showing steps in the method according to the present invention in an externally created MIDI file. As shown, at step 70, the externally created melody is in the musical key of C Major and needs to be adapted, for example, to the musical key of A minor to harmonically work with the harmonic chord map of a song received as an input file. At step 72, the external MIDI file is imported or received by the system of the present invention where it is adapted. As shown in step 74, the adaptation is achieved by auto-selecting notation which is not in the musical key of A minor and moving them to the nearest note position that is correct for the key of A minor. All other notation that is in common to both musical keys C Major and A minor are left unaltered. At step 76, the adapted MIDI file is output.

FIGS. 10 to 14 show a further example of the present invention in use in generating an audio or MIDI output file in which the process of generating content blocks differs to that described with reference to FIGS. 4 to 9.

Figure 10:
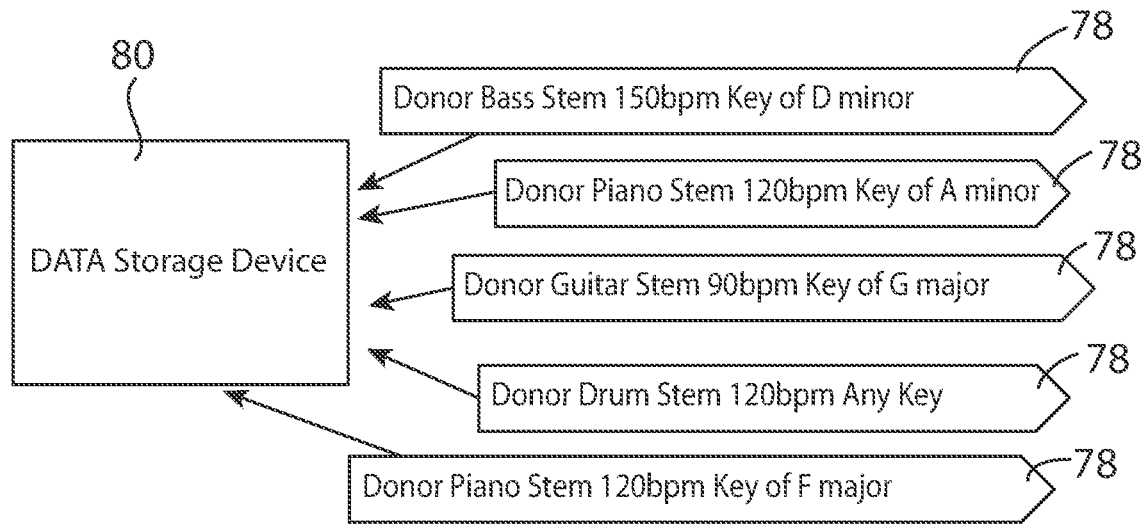
FIGS. 10 to 14 are flow diagrams showing a further example of the present invention in use in generating an audio or MIDI output file.

As shown in FIG. 10, the step of generating audio or MIDI content blocks includes an initial step of receiving audio or MIDI files 78 including content in a harmonic key from at least one musical performance and determining the harmonic key of the musical performance. Once determined each received audio or MIDI file 78 is stored in storage means 80 as an audio or MIDI content block. Thus multiple musicians, composers or others provide unrelated single instrument performance recordings of varying lengths and of varying tempos and harmonic structure to a collective data bank for storage in either local or cloud based storage as content blocks.

Figure 11:
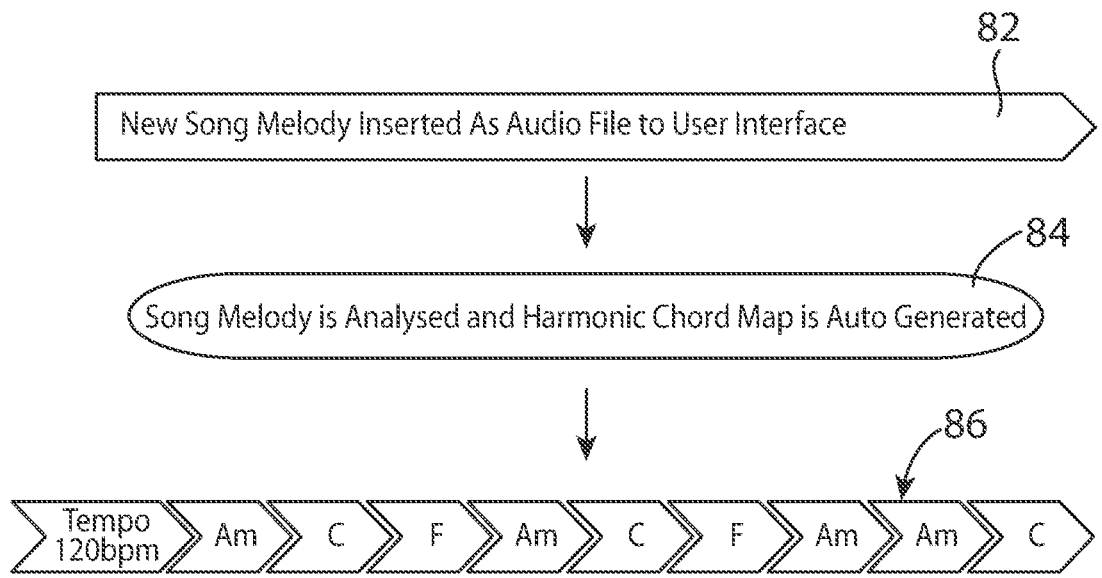

The audio or MIDI content blocks are stored and retrievable from storage means 80 according to musical instrument type, tempo and/or harmonic key of the musical performance. As shown in FIG. 11, at step 82, an input file having audio or MIDI music content is received, such as via a user interface means. In this way, users, such as singers or songwriters may input a song melody and or a measured harmonic chord structure of a song or musical passage. At step 84, the input file or song melody is analysed and a harmonic chord map and tempo 86 is automatically generated for that song melody. Alternatively a user may manually input a chord structure for a song.

Figure 12:
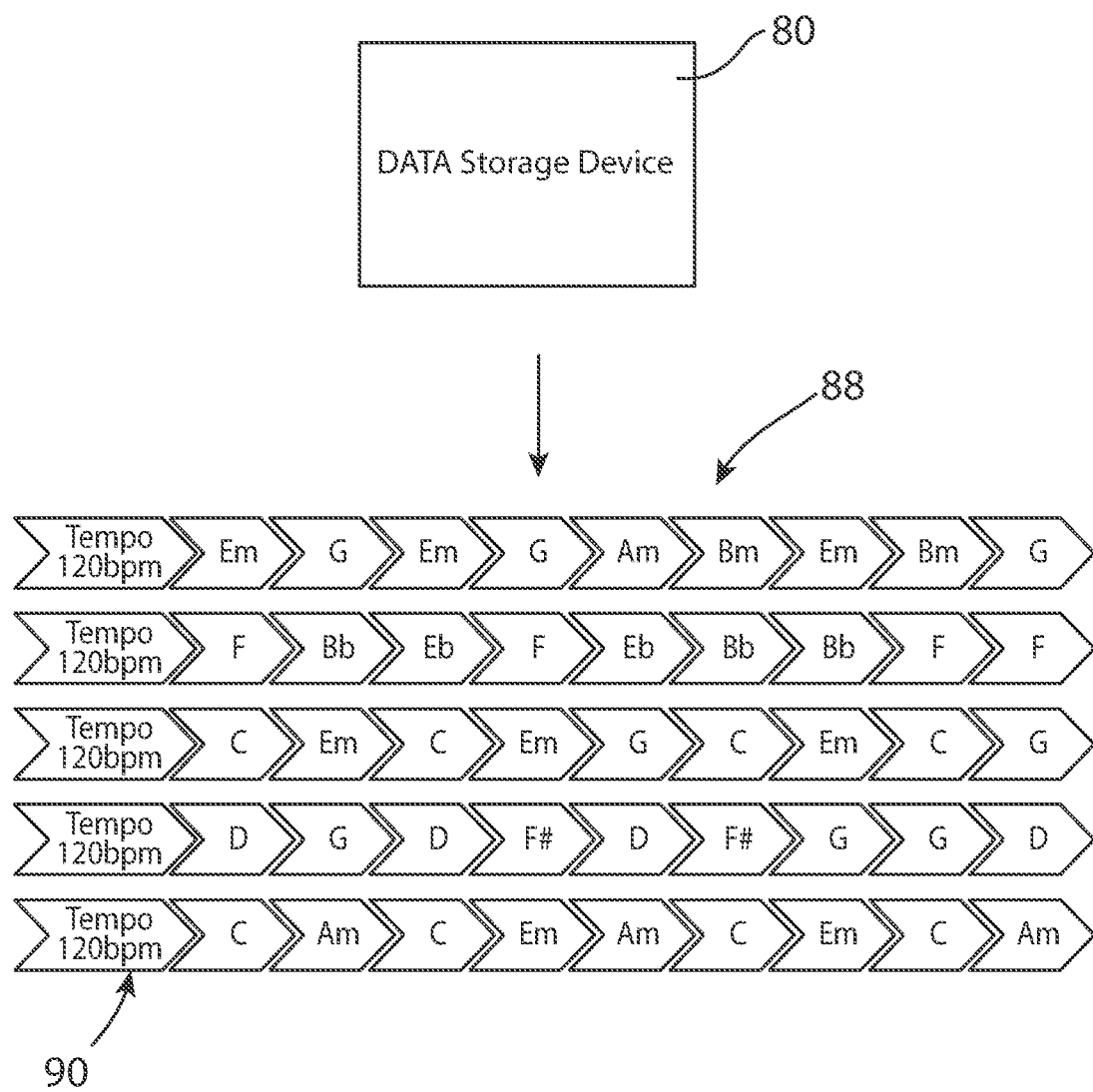

At FIG. 12, the steps involved in using the harmonic chord map of the input file 82 to select content blocks are shown. Initially, a user selects from a user interface an instrument type (such as guitar, bass, piano etc) from a selection menu. Such a selection may also be based on mood and/or musical style.

At step 88, content blocks 90 that match the tempo of music in the harmonic chord map are identified. In the instance shown, the tempo was determined for the music represented in the harmonic chord map as 120 bpm and so content blocks having a tempo of 120 bpm are identified. It will however be understood that tempo changes at different parts of a harmonic chord map will result in identifying content blocks at those different tempos.

Figure 13:
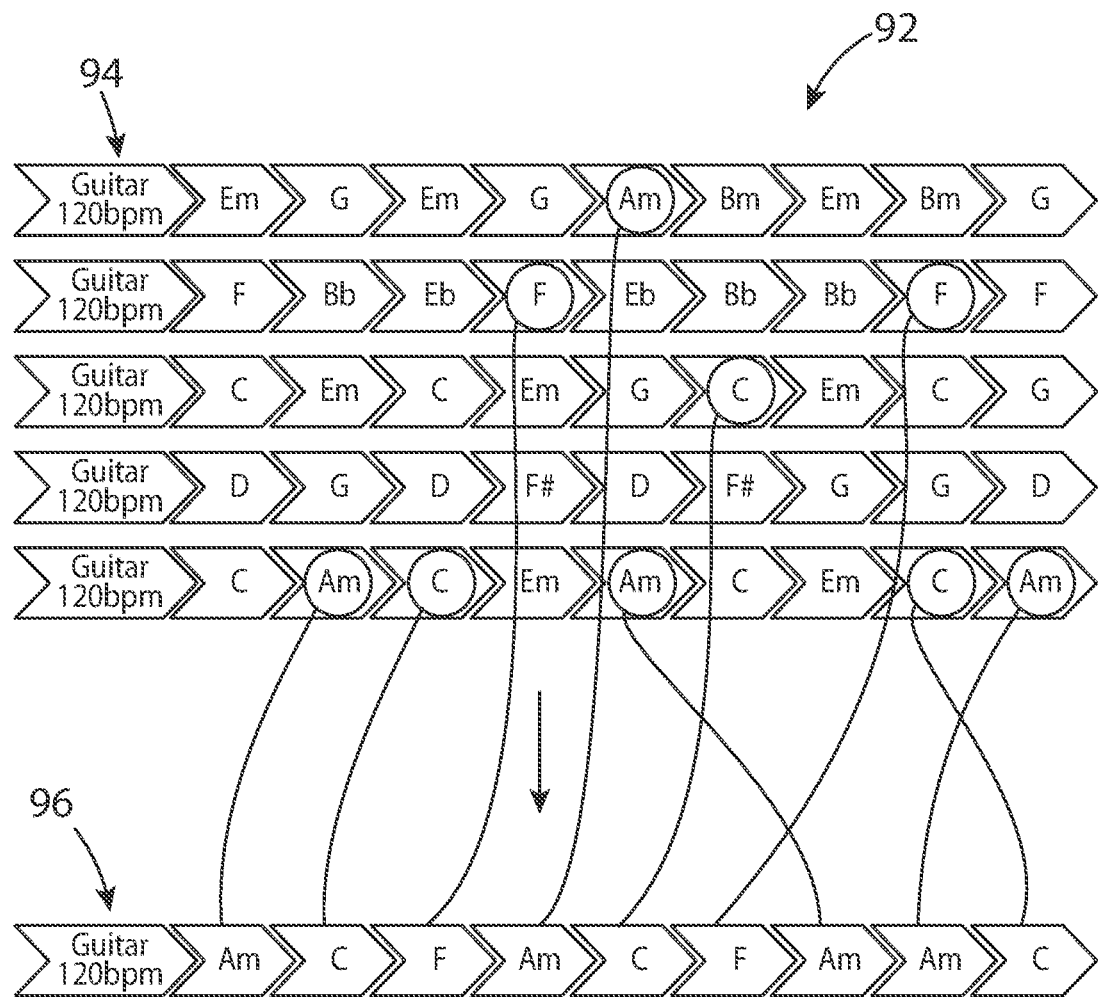

As shown in FIG. 13, at step 92, content blocks 94 at the determined tempo of 120 bpm for the harmonic chord map and for a selected instrument type, in the instance shown, as a guitar, are identified. Then for the selected instrument type and for each bar of music in the harmonic chord map, at step 96, content blocks are selected automatically from the identified content blocks that are in the same harmonic key or that has a part or section that is in the same harmonic key as the bar of music for the instrument.

Thus different parts of different content blocks derived from different musical performances for the selected instrument are effectively cut out and assembled along the harmonic chord map of the input file to provide an ensemble backing track for the input file. Sections or parts of a selected content block that are not in the same harmonic key as the bar of music of the harmonic chord map may be removed to ensure harmonic integrity with the underlying harmonic chord map.

The present invention thus analyses each content block stem for harmonic chord compatibility. When content blocks are found to have whole or partial harmonic compatibility, those parts are cut out and applied to the part or section of the inputted song structure's harmonic chord map that is deemed to be a match.

Figure 14:
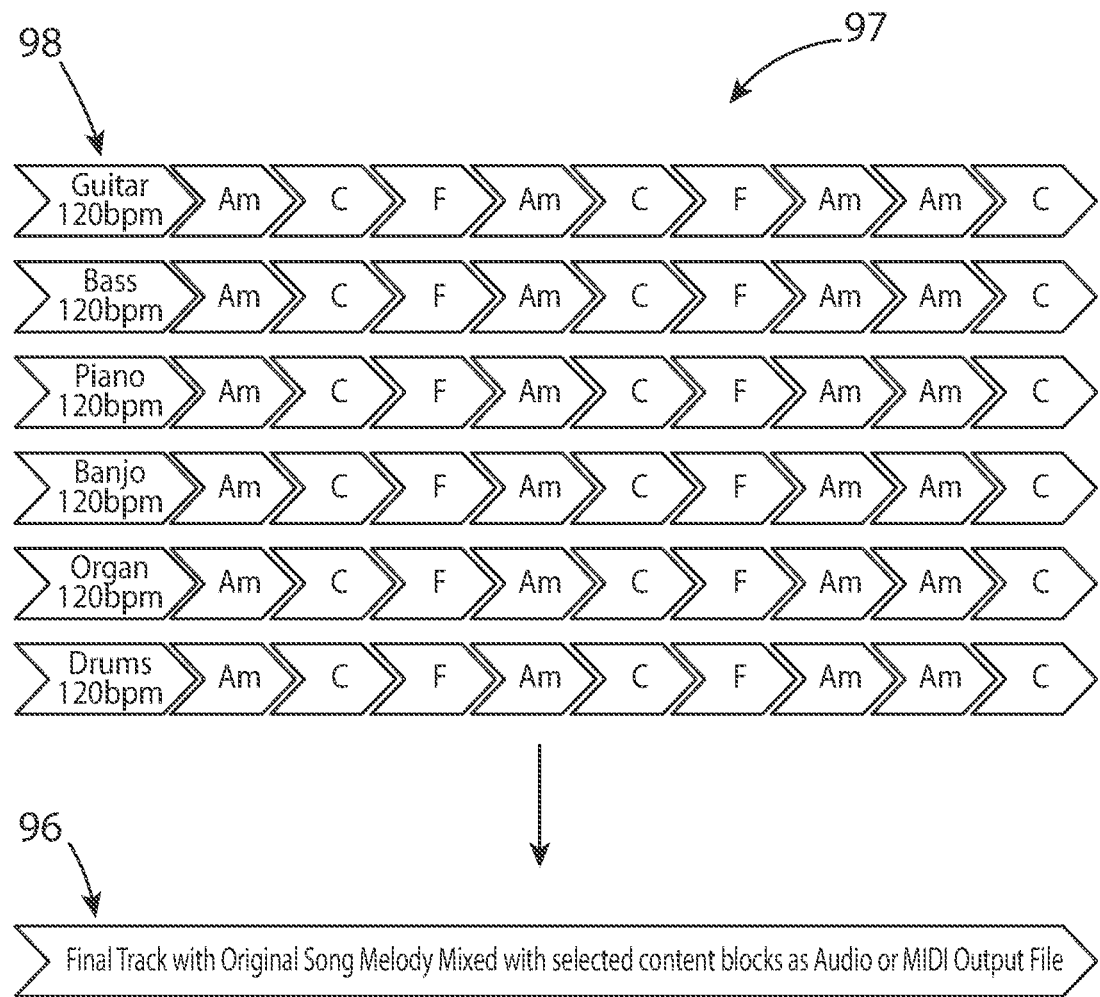

As shown in FIG. 14, at step 97, the process is then repeated for all desired instruments the user has selected to include in the accompanying backing track for the original input song. In the instance shown, content blocks 98 are selected for instrument types, including guitar, bass, piano, banjo, organ and drums, although it will be understood that any alternative or additional combinations of instruments may be used as required or as desired.

As shown in step 99, an audio or MIDI output file including the arrangement of content blocks 98 and the original input file song 82 is generated to provide an adapted unique version of the original input file for playback.

The present invention is thus further adapted to enable bands or artists to write new songs in their basic format which is inputted as an audio vocal file or MIDI file for the new song. The invention is configured to search through archived files and cuts relevant usable sections from many different unrelated recordings to combine relevant audio or MIDI content blocks together for any or multiple different instruments thereby creating a new backing track audio or MIDI file for the new song from previously unused recorded content in that band or artists personnel content archive.

It is also possible to shuffle an instrument thus replacing it for a preferred performance at which point the system repeats the entire process for that chosen instrument.

Furthermore the present platform and architecture can be applied to further enhance editing, mixing and shuffling of instruments. It is also possible to have a plurality of moods, music styles and genres transition from one to another within the same song structure and vocal performance. In other words the song could start as a country song and at any point transition to hip-hop, Latin, rock, orchestral etc all within the same track as it plays out. As described using the process above the present invention will also apply a unique identifier to every output file generated to ensure that every output file is entirely unique and thus never replicated for the same or any other song or vocal melody inputted and received.

Figure 15:
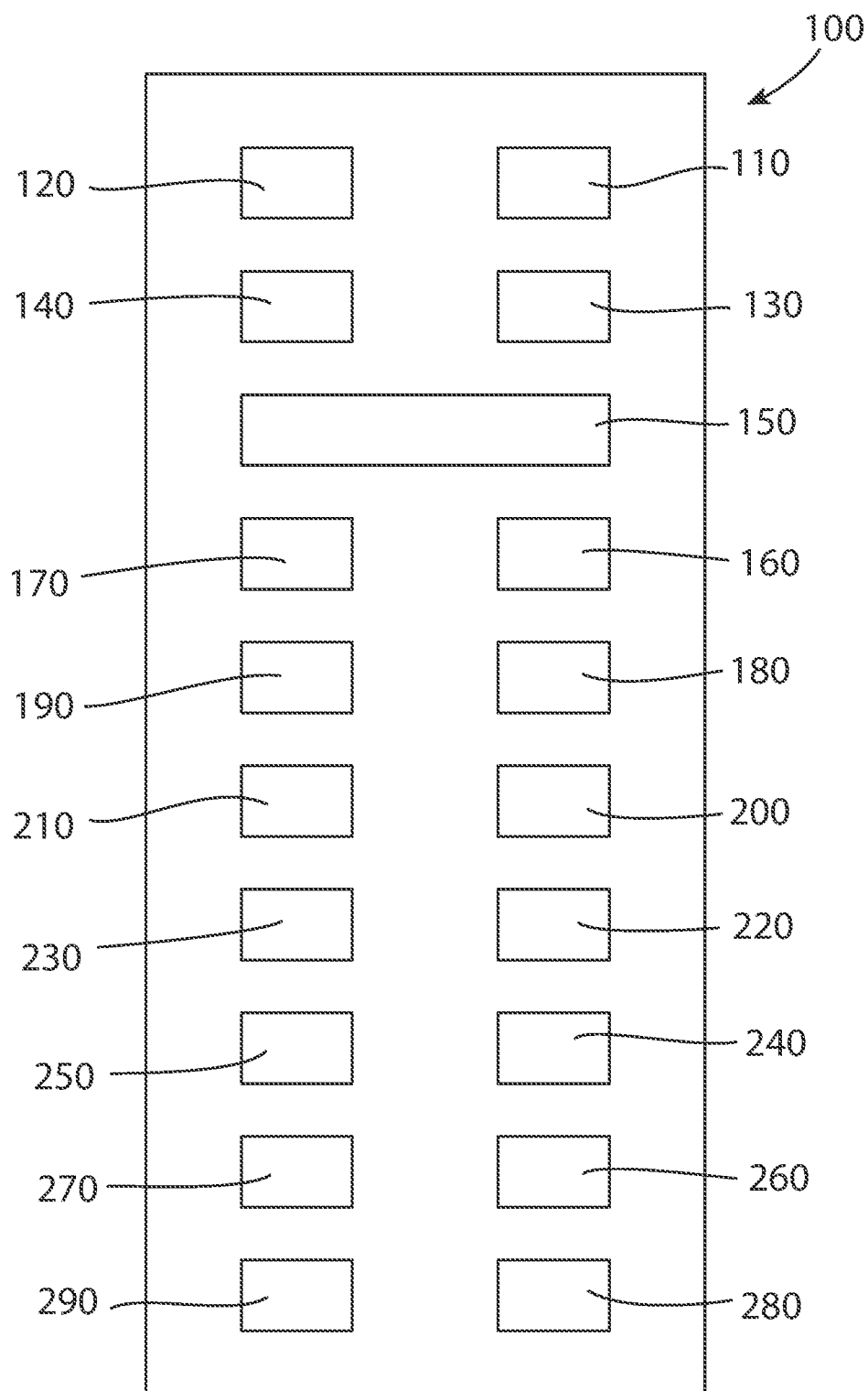
FIG. 15 shows a system for adapting an audio or MIDI input file for use in generating an output file according to the present invention.

FIG. 15 shows a system 100 for generating an audio or MIDI output file to adapt an audio or MIDI input file according to the present invention. The system 100 includes means 110 for generating audio or MIDI content blocks from one or more musical performances; means 120 for receiving an input file having audio or MIDI music content; means 130 for determining a chord structure and tempo for the input file; means 140 for generating a harmonic chord map from the chord structure and tempo for the input file; content block selection means 150 for using the harmonic chord map to automatically select content blocks, and means 160 for generating the output file by combining the selected content blocks and the input file.

The content block selection means 150 is further configured for determining the harmonic key and tempo of each bar in the harmonic chord map of the input file and for selecting content blocks corresponding to a plurality of selected musical instruments for each bar according to the determined harmonic key and tempo.

The content block selection means 150 is also configured for identifying content blocks for the or each instrument type that match the tempo of each bar of music in the harmonic chord map, and for automatically selecting a content block from the identified content blocks that is in the same harmonic key or that has a part or section that is in the same harmonic key as the bar of music in the harmonic chord map for each selected instrument type.

The system also includes means 170 for receiving an audio or MIDI file including content in an harmonic key from a musical performance for use in generating the content blocks; means 180 for determining the harmonic key and adapting the musical performance to correspond to at least one alternative harmonic key, and means 190 for recording said adapted musical performance in said alternative harmonic key to generate the audio or MIDI content blocks.

The means 190 is further operable for storing each received audio or MIDI file as an audio or MIDI content block and for retrieving audio or MIDI content blocks according to musical instrument type, tempo and/or harmonic key of the musical performance.

The means 190 is further configured for adapting a musical performance to correspond to all harmonic keys, including minor and major keys, and to a plurality of different tempos, and for recording said adapted musical performance in all of said harmonic keys and tempos to generate a plurality of audio or MIDI content blocks. The means 190 is also configured for generating audio or MIDI content from a plurality of musical performances, in which each musical performance includes musical content from a different musical instrument. Means 190 is further configured for adapting content blocks and/or an output file generated according to one or more of different moods, styles and/or genres.

The means 190 is thus configured for generating audio or MIDI content blocks for each musical performance in all twelve harmonic keys, in both major and minor keys (i.e. 24 harmonic keys), in a plurality of different tempos, and according to one or more of different moods, styles and/or genres.

The system includes means 200 for cutting the audio or MIDI content blocks to desired intervals/or and lengths, and means 210 for storing the audio or MIDI content blocks in storage means. Also shown is means 290 for linking a plurality of storage devices 210 to provide an extended storage library of content blocks and audio or MIDI output files for creating further content blocks for re-use.

The system further includes means 220 for assigning a unique identifier or tag to each content block to enable the content block selection means 150 to use the unique identifiers to select a unique combination of content blocks.

The system includes storage means 230 for storing a record of the combination of unique identifiers for the selected blocks of the audio of MIDI output file generated in a storage device.

The system also includes various tools for use by a user to provide full creative control over an output file generated, and for content blocks, including a hold and replace module 240; a shuffle module 250; an audio editing and mixing module 260; a synchronisation module 270 and means 280 for importing other instrument performances and/or voice from an external source for incorporation into the output file.

Aspects of the present invention have been described by way of example only and it should be appreciated that additions and/or modifications may be made thereto without departing from the scope thereof as defined in the appended claims.

What is claimed is:

1. One or more non-transitory computer readable storage media containing instructions for generating an audio output file, wherein, when executed, the instructions cause one or more processors to:
   receive an audio input file comprising musical content, wherein the musical content includes at least one musical performance;
   automatically generate a harmonic chord map corresponding to the musical content of the audio input file;
   use the harmonic chord map to automatically select a subset of musical content blocks from a group of musical content blocks in which the subset of musical content blocks harmonically support the musical content of the audio input file, and
   generate the audio output file by combining the subset of musical content blocks and the audio input file.

2. The one or more non-transitory computer readable storage media of claim 1, wherein the musical content blocks are derived from one or more musical performances.

3. The one or more non-transitory computer readable storage media of claim 2, wherein the one or more musical performances comprise one or more instrumental performances.

4. The one or more non-transitory computer readable storage media of claim 2, wherein the one or more musical performances comprise one or more recorded live instrument performances.

5. The one or more non-transitory computer readable storage media of claim 1, wherein the musical content blocks exist prior to receiving the audio input file.

6. The one or more non-transitory computer readable storage media of claim 1, wherein, when executed, the instructions cause the one or more processors to store the musical content blocks prior to receiving the audio input file.

7. The one or more non-transitory computer readable storage media of claim 1, wherein causing the one or more processors to generate the audio output file using the subset of musical content blocks and the audio input file comprises causing the one or more processors to combine the subset of musical content blocks and the audio input file.

8. The one or more non-transitory computer readable storage media of claim 1, wherein the harmonic chord map comprises a representation of successive musical chords of the at least one musical performance of the audio input file.

9. The one or more non-transitory computer readable storage media of claim 1, wherein the harmonic chord map comprises a representation of successive harmonic keys of the at least one musical performance of the audio input file.

10. The one or more non-transitory computer readable storage media of claim 1, wherein the harmonic chord map comprises a representation of the tempo of the at least one musical performance of the audio input file.

11. The one or more non-transitory computer readable storage media of claim 1, wherein the musical content blocks comprise first musical content blocks corresponding to music from a first musical instrument and second musical content blocks corresponding to music from a second musical instrument.

12. The one or more non-transitory computer readable storage media of claim 11, wherein the subset of musical content blocks comprises at least some of the first musical content blocks and at least some of the second musical content blocks.

13. The one or more non-transitory computer readable storage media of claim 1, wherein the subset of musical content blocks are selected based on at least one of an instrument type, a musical style, or mood.

14. The one or more non-transitory computer readable storage media of claim 1, wherein the at least one musical performance comprises at least one vocal performance.

15. The one or more non-transitory computer readable storage media of claim 1, wherein the at least one musical performance comprises at least one instrumental performance.

16. One or more non-transitory computer readable storage media containing instructions for providing an audio output file, wherein, when executed, the instructions cause the one or more processors to:
   receive an audio input file comprising musical content, wherein the musical content includes at least one musical performance; and
   provide the audio output file, wherein:
      the audio output file includes a subset of musical content blocks combined with the audio input file,
      the subset of musical content blocks has been automatically selected from a group of musical content blocks based on a harmonic chord map,
      the subset of musical content blocks harmonically support the musical content of the audio input file, and
      the harmonic chord map has been automatically generated based on the musical content of the audio input file.

17. The one or more non-transitory computer readable storage media of claim 16, wherein the musical content blocks are derived from one or more musical performances.

18. The one or more non-transitory computer readable storage media of claim 17, wherein the one or more musical performances comprise one or more instrumental performances.

19. The one or more non-transitory computer readable storage media of claim 17, wherein the one or more musical performances comprise one or more recorded live instrument performances.

20. The one or more non-transitory computer readable storage media of claim 16, wherein the musical content blocks exist prior to receiving the audio input file.

21. The one or more non-transitory computer readable storage media of claim 16, wherein the audio output file is generated using the subset of musical content blocks and the audio input file by combining the subset of musical content blocks and the audio input file.

22. The one or more non-transitory computer readable storage media of claim 16, wherein the harmonic chord map comprises a representation of successive musical chords of the at least one musical performance of the audio input file.

23. The one or more non-transitory computer readable storage media of claim 14, wherein the harmonic chord map comprises a representation of successive harmonic keys of the at least one musical performance of the audio input file.

24. The one or more non-transitory computer readable storage media of claim 16, wherein the harmonic chord map comprises a representation of the tempo of the at least one musical performance of the audio input file.

25. The one or more non-transitory computer readable storage media of claim 16, wherein the musical content blocks comprise first musical content blocks corresponding to music from a first musical instrument and second musical content blocks corresponding to music from a second musical instrument.

26. The one or more non-transitory computer readable storage media of claim 25, wherein the subset of musical content blocks comprises at least some of the first musical content blocks and at least some of the second musical content blocks.

27. The one or more non-transitory computer readable storage media of claim 16, wherein the subset of musical content blocks are selected based on at least one of an instrument type, a musical style, or mood.

28. One or more non-transitory computer readable storage media containing instructions for providing musical content blocks, wherein, when executed, the instructions cause the one or more processors to:
    use a harmonic chord map to automatically select a subset of musical content blocks from a group of musical content blocks,
    wherein the harmonic chord map has been automatically generated based on an audio input file comprising musical content, wherein the musical content includes at least one musical performance; and
    configure the subset of musical content blocks to be combined with the at least one musical performance for an audio output file, and in which the subset of musical content blocks harmonically support the musical content of the audio input file.

29. The one or more non-transitory computer readable storage media of claim 28, wherein, when executed, the instructions cause the one or more processors to generate the audio output file including the at least one musical performance and the configured subset of musical content blocks.

30. The one or more non-transitory computer readable storage media of claim 28, wherein, when executed, the instructions cause the one or more processors to automatically generate the harmonic chord map based on the at least one musical performance.

\* \* \* \* \*